United States Patent
Kamber et al.

(10) Patent No.: US 9,027,915 B2
(45) Date of Patent: May 12, 2015

(54) RETRACTABLE ASSEMBLY

(75) Inventors: Walter Kamber, Dietgen (CH); Lukas Schneider, Tecknau (CH)

(73) Assignee: Endress + Hauser Flowtec AG, Reinach (CH)

( * ) Notice: Subject to any disclaimer, the term of this patent is extended or adjusted under 35 U.S.C. 154(b) by 938 days.

(21) Appl. No.: 13/192,657

(22) Filed: Jul. 28, 2011

(65) Prior Publication Data

US 2012/0027552 A1 Feb. 2, 2012

(30) Foreign Application Priority Data

Jul. 28, 2010 (DE) .......................... 10 2010 038 540

(51) Int. Cl.
| | | |
|---|---|---|
| B23Q 1/00 | (2006.01) | |
| G01D 21/00 | (2006.01) | |
| G01B 7/14 | (2006.01) | |
| G01B 7/30 | (2006.01) | |
| G01F 15/18 | (2006.01) | |
| G01D 11/30 | (2006.01) | |
| G01K 1/14 | (2006.01) | |
| B25J 11/00 | (2006.01) | |

(52) U.S. Cl.
CPC ................ G01F 15/18 (2013.01); G01D 11/30 (2013.01); G01K 1/14 (2013.01)

(58) Field of Classification Search
USPC .......................... 269/47; 73/866.5; 324/207.13
See application file for complete search history.

(56) References Cited

U.S. PATENT DOCUMENTS

| | | | | |
|---|---|---|---|---|
| 2,737,709 | A * | 3/1956 | Lovelace | 269/47 |
| 3,176,568 | A * | 4/1965 | Bradley | 83/468 |
| 3,829,761 | A | 8/1974 | Shimizu | |
| 5,440,949 | A * | 8/1995 | Leibman | 464/180 |
| 6,131,473 | A | 10/2000 | Hoffman | |
| 6,903,544 | B2 * | 6/2005 | Kurz et al. | 324/207.13 |
| 7,071,680 | B2 * | 7/2006 | Kurz et al. | 324/207.13 |
| 7,437,988 | B2 * | 10/2008 | Andersson et al. | 92/5 R |
| 7,516,679 | B2 * | 4/2009 | Bell et al. | 73/866.5 |
| 8,607,451 | B2 * | 12/2013 | Arase et al. | 29/889.1 |
| 2002/0083977 | A1 | 7/2002 | Beck | |
| 2008/0271548 | A1 * | 11/2008 | Janz et al. | 73/866.5 |
| 2010/0038835 | A1 * | 2/2010 | Horiuchi et al. | 269/47 |
| 2011/0000080 | A1 * | 1/2011 | Arase et al. | 29/700 |

FOREIGN PATENT DOCUMENTS

| | | |
|---|---|---|
| DE | 2 320 743 | 11/1974 |
| DE | 10054272 A1 | 5/2002 |
| DE | 10 2009 046 443 A1 | 5/2011 |

(Continued)

OTHER PUBLICATIONS

Search Report.

(Continued)

*Primary Examiner* — Lee D Wilson
*Assistant Examiner* — Alvin Grant
(74) *Attorney, Agent, or Firm* — Bacon & Thomas, PLLC

(57) ABSTRACT

A retractable assembly for introducing an insertable device into a container through a container opening, comprising: a linear guide, which is releasably mountable on the container via a holder; and, guided along the linear guide, a slider, on which an articulated head is so seated, that it has at least two degrees of freedom perpendicular to the linear guide, wherein the insertable device is at least axially guided in the articulated head in the mounted state.

10 Claims, 2 Drawing Sheets

(56) References Cited

FOREIGN PATENT DOCUMENTS

| | | |
|---|---|---|
| DE | 102009046443 A1 | 5/2011 |
| FR | 2 668 232 A1 | 4/1992 |
| FR | 2668232 A1 | 4/1992 |
| JP | 06229454 A | 8/1994 |
| WO | WO 2007/068533 A2 | 6/2007 |

OTHER PUBLICATIONS

Search Report from the German Patent Office.

International Search Report, Oct. 21, 2011, The Neatherlands.

English translation of IPR, Feb. 7, 2013, Geneva.

* cited by examiner

RETRACTABLE ASSEMBLY

TECHNICAL FIELD

The present invention relates to a retractable assembly for introducing an insertable device into a container through a container opening.

BACKGROUND DISCUSSION

From the state of the art, retractable assemblies are known, which enable introduction of insertable devices into a container, especially a container under pressure. These retractable assemblies are, most often, very complicated in construction and therewith expensive. Others introduce, during use, high mechanical stresses into the insertable devices.

SUMMARY OF THE INVENTION

An object of the invention is to provide a retractable assembly for an insertable device, which assures an as stress free as possible introduction of the insertable device into a container under pressure.

The object is achieved by a retractable assembly for introducing an insertable device into a container or into a pipe, through an opening into the container or through an opening in the pipe, includes a linear guide, which is releasably mountable on the container via a holder, a slider guided along the linear guide and an articulated head, which is so seated on the slider, that it has at least one translational degrees of freedom perpendicular to the linear guide. The articulated head is so embodied that the insertable device is guided at least axially in the articulated head. Especially, the articulated head includes a passageway, for example, a traversing bore, through which the insertable device can pass. A seating of the articulated head on the slider with one or two additional, rotational degrees of freedom about one or both of the translational degrees of freedom can also be provided.

BRIEF DESCRIPTION OF THE DRAWINGS

The invention permits numerous forms of embodiment. A selection thereof will be explained briefly here in greater detail based on the appended drawing. Equal elements are provided in the figures of the drawing with equal reference characters. The figures of the drawing show as follows.

DETAILED DISCUSSION IN CONJUCTION WITH THE DRAWINGS

Figure 1:
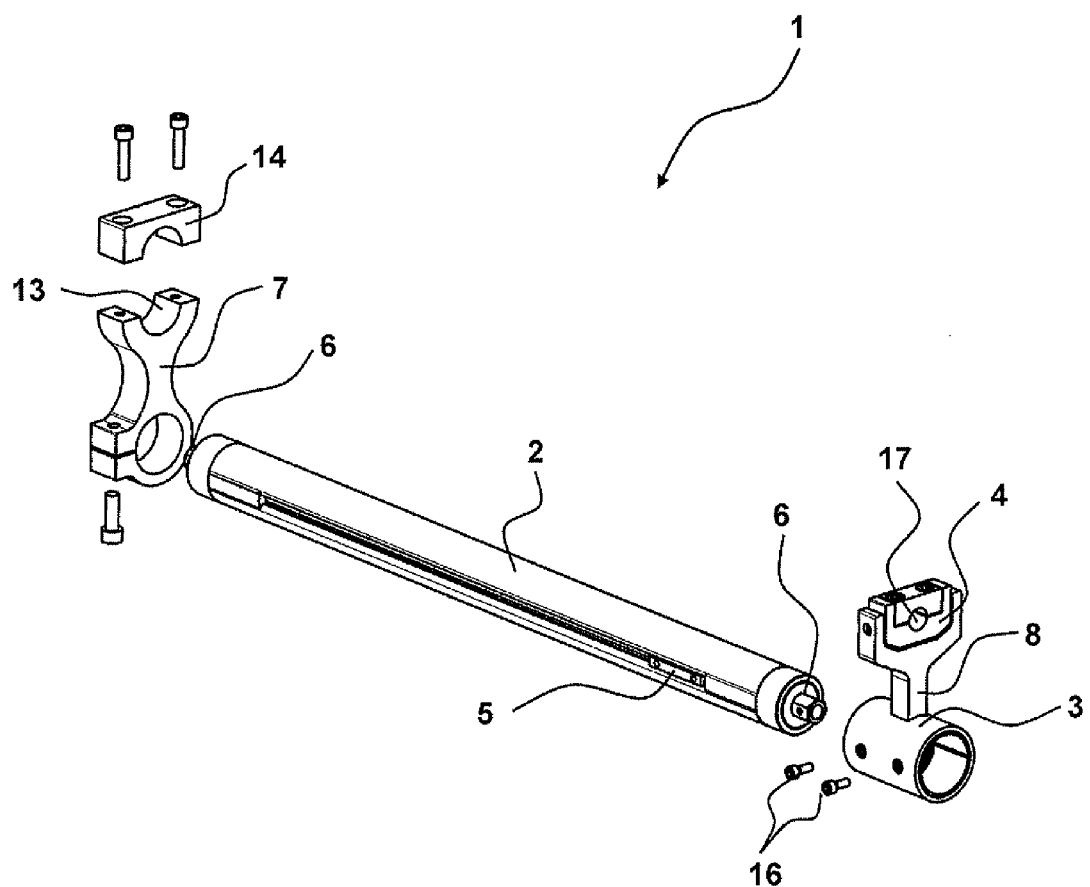
FIG. 1 shows perspectively, a retractable assembly of the invention.

FIG. 1 shows an exploded view of a retractable assembly of the invention 1. The retractable assembly 1 is shown here in an unassembled state. The retractable assembly includes a linear guide 2, which is releasably mountable, e.g. via a holder 7, on a container (not shown), which is filled especially with a gaseous medium having a pressure greater than 1 bar. For this purpose, the container, for example, a vessel or a pipeline, has a nozzle, for example. The nozzle is, in such case, for example, set on the container or on the pipeline. Especially, the nozzle is bonded, e.g. welded, to the container or to the pipe of the pipeline, in order to provide an opening into the container or pipeline, into which opening the insertable device is to be inserted with the assistance of the retractable assembly 1.

Furthermore, the linear guide 2 includes a slider 3, which here is pushed onto the linear guide 2 and thereby axially guided by and along the linear guide 2. The slider 3 is connected via the connecting screws 16 with the threaded nut 5. The threaded nut 5 is guided in an offset groove in the linear guide 2 as a track and engages with a spindle, e.g. a trapezoidal thread spindle, which is journaled (not shown) in the linear guide 2 rotatably about its own longitudinal axis. As a result, the nut and the spindle form a gear unit, also referred to as a jack unit, which converts a rotational movement of the spindle into a lengthwise movement of the nut, respectively of the slider 3, along the linear guide 2. The spindle is radially constrained in the linear guide for this purpose. The journaling of the spindle absorbs especially the forces in the axial direction. Besides the spindle, other variants for applying a force on the slider 3 in the direction of the linear guide 2 are known to those skilled in the art, e.g. via a pneumatic or hydraulic unit or other mechanically advancing, transmission elements. In the case of the retractable assembly 1 shown here, the spindle has two end faces, each of which has a coupling for transmission of a torque about the longitudinal axis of the spindle onto the spindle. The couplings are here embodied as hex heads 6. Thus, a simple open ended wrench or a correspondingly embodied handwheel can be utilized for transmitting torque to the spindle.

Carried on the slider 3 is an articulated head 4, here in a fork 8. The articulated head 4 is, in such case, so seated on the slider 3 that it has at least two transverse degrees of freedom perpendicular to the linear guide. The articulated head 4 is movable in the directions of these two transverse degrees of freedom. Thus, it is seated shiftably in these two directions perpendicular to the linear guide, in order to be able to perform equalizing movements and, thus, to introduce the insertable device as stress freely as possible, or at least with low stress, into the container opening. If a force is exerted on the articulated head 4 in one or both of the two directions perpendicular to the linear guide, this leads to an equalizing movement in the direction of the force. The opposing force is only a very low force, for example, brought about by friction.

In this example, the articulated head is divided in two. It includes a first clamping jaw 10 and a second clamping jaw 11. These two components form a opening 17 for the insertable device. The insertable device, especially one of process measurements technology, especially of flow- and/or temperature measuring technology, is in the mounted state led through the opening 17 of the articulated head 4 and is thereby at least axially guided in the articulated head 4. The insertable device includes therefor a shape and size complementary to the opening 17 at a predetermined location on the insertable device, especially a corresponding outer diameter. If the insertable device has, furthermore, e.g. a shoulder or other thickening, e.g. a securing nut for the screwing together of the insertable device with the nozzle, and the thickening, in the mounted state, is arranged between the articulated head and the container or pipe, then the articulated head 4 forms a radial stop. Via the articulated head 4, thus, a force can be exerted on the insertable device in the direction of the container or pipe. Another option is that a separate stop is arranged on the slider and the articulated head is provided only for the axial guiding of the insertable device. Alternatively thereto, the insertable device is clamped between the clamping jaws 10 and 11 of the articulated head 4.

As in the case of the articulated head, also the holder 7 is divided in this example in two. It includes a third clamp face 18 and a fourth clamp face 19. The third and fourth clamping jaws 18 and 19 define, analogously to the first and second clamping jaws, an opening for accommodating the nozzle, in order to clamp the linear guide solidly thereon. The holder 7 is, thus, releasably indirectly mountable on the container or pipe. In other embodiments of the invention, the linear guide is also directly mountable on the container or pipeline via the holder.

A system of the invention for introducing the insertable device, especially a flow measuring device or a temperature measuring device, into the container or pipeline through an opening of the container or pipeline includes, thus, a retractable assembly of the invention, the container and the insertable device. The linear guide includes a holder, which is so embodied that the linear guide is releasably mountable on a nozzle, especially on a nozzle exterior, attached to the container and embodied to be complementary to the holder of the linear guide. The insertable device is then introducible through the nozzle into the container or pipeline. The nozzle borders, in such case, the opening of the container or pipe of the pipeline. The articulated head includes a tightening apparatus, which is so embodied that the insertable device is clampable in the articulated head at a predetermined position of the insertable device. Furthermore, the nozzle can be embodied as a valve, e.g. as a ball valve. In the interior of the container or pipeline can be located a medium, e.g. a gas, with a pressure greater than the ambient pressure outside of the container or pipeline. By closing the valve, an escape of the medium from the container or pipeline through the opening, respectively through the nozzle, is avoided. Also, a valve, e.g. a ball valve, can be arranged between the nozzle and the container or pipeline.

Figure 2:
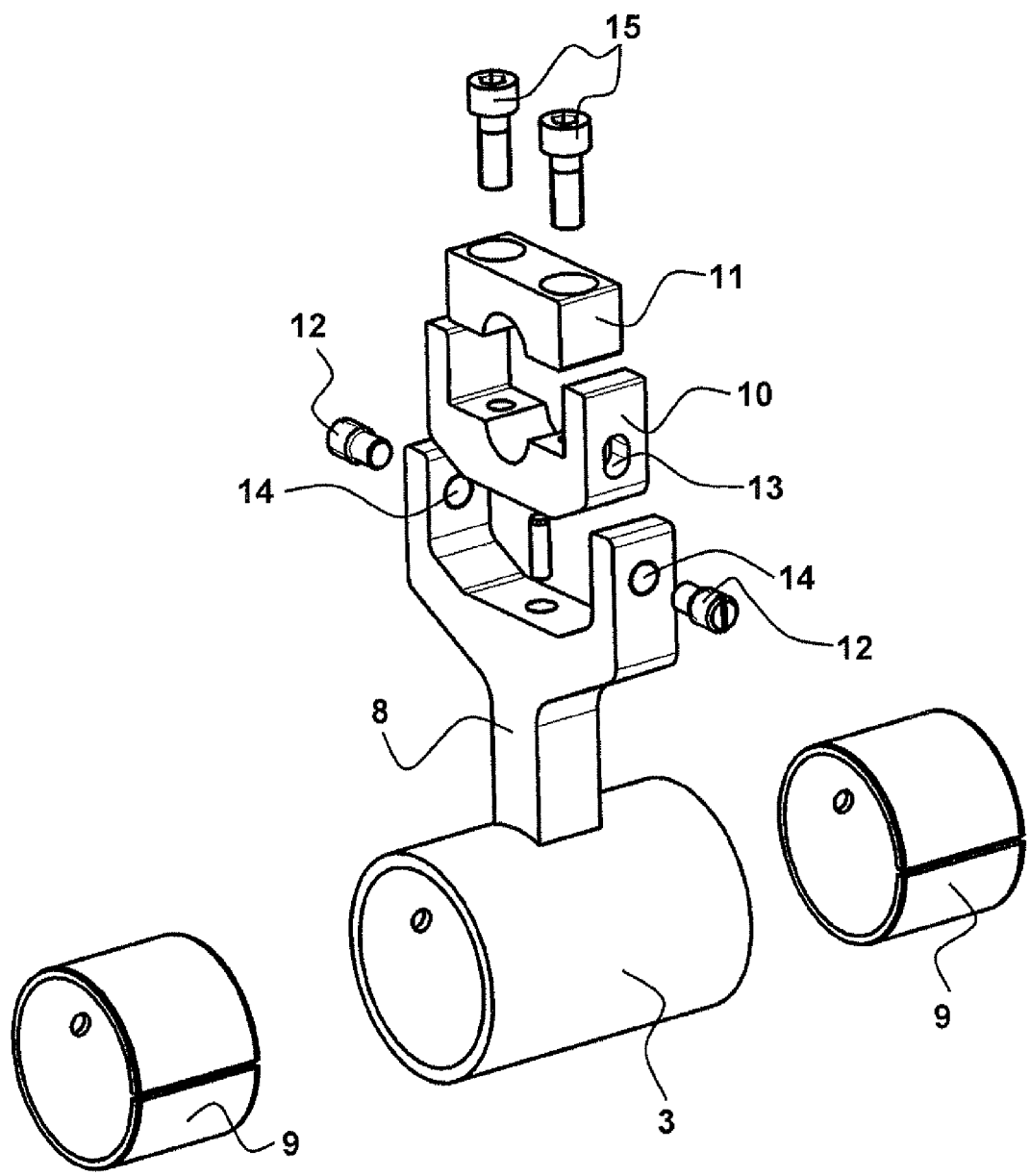
FIG. 2 shows perspectively, the slider with fork and articulated head of the retractable assembly of the invention from FIG. 1.

FIG. 2 shows another exploded view, here of the slider 3 with fork 8 and articulated head 4 of the retractable assembly of the invention from FIG. 1. As already explained with respect to FIG. 1, the articulated head 4, composed of the first clamping jaw 10 and the second clamping jaw 11, is seated in a fork 8. In this regard, the articulated head 4 includes, here, the first clamp face 10, a groove 13, with a width, which is slightly greater than the outer diameter of a pin 12, which pin 12 is guided in the groove 13 in the mounted state of the retractable assembly, and with a length, which is clearly greater than the outer diameter of the pin 12. In this way, the articulated head 4 is freely movably in the longitudinal direction of the groove 13 and, within the limits provided by the pairing, pin and groove, shiftable. If the longitudinal direction of the groove 13 is perpendicular to the linear guide, and here then also parallel to the vertical axis of the fork 8, the articulated head 4 has a degree of freedom in this direction, along which it is movable by applying a very small force pointing in this direction, especially in order to execute an equalizing movement. The articulated head 4 would also be rotatable about the longitudinal axis of the pin 12 in the described embodiment, without other constraints. Because of an additional stop, here, the articulated head 4 is, however, only rotatable through a predetermined angle about the longitudinal axis of the pin 12. Thus, the articulated head on the slider is rotatable about at least a first rotation axis perpendicular to the linear guide and it has an additional, third degree of freedom. The stop can be formed, for example, by another groove-pin connection in the fork, e.g. parallel to or along the vertical axis of the fork, or the stop is formed by the geometric shapes of the fork 8 and the articulated head 4. If the articulated head 4 has a predetermined broad surface perpendicular to the named rotation axis and the fork 8 includes a surface lying opposite this surface, wherein the two surfaces have a predetermined maximum distance from one another, which results from the maximum deflection of the articulated head 4 relative to the degree of freedom, which is limited by the groove 13 and the pin 12, then, by tilting the named surface of the articulated head relative to the named surface of the fork at a predetermined angle, the surface edge of the area of the articulated head lies on the named surface of the fork. In this way, a rotating of the articulated head beyond this predetermined angle is prevented.

If, in this example of an embodiment of the invention, the fork 8 is journaled about its vertical axis rotatably on the slider 3, then the articulated head 4 has an additional, fourth degree of freedom. It is then rotatable about a second axis, which is perpendicular to the linear guide and which is perpendicular to the first axis, about which the articulated head 4 is rotatably seated in the fork 8.

If the articulated head 4 is rotated about the first rotation axis, the longitudinal axis of the groove 13 thus has an angle other than 90° relative to the linear guide, if the articulated head 4 is shiftable in the direction of the longitudinal axis of the groove 13, then a directional component of a possible movement direction of the articulated head is perpendicular to the linear guide. The magnitude of this directional component depends on the angle of rotation of the articulated head 4. The maximum angle that the articulated head can rotate about an axis perpendicular to the linear guide amounts to less than 90°.

The groove 13 has a sufficient depth, in order that the pin 12 does not reach to the groove base, for limiting frictional forces, on the one hand, and for assuring the movement freedom of the articulated head 4 in the direction perpendicular to the linear guide and perpendicular to the vertical axis of the fork 8. The articulated head 4 has, at least on one side of the articulated head, a predetermined distance from the fork 8, here a tined fork 8, even when the articulated head 4 contacts the fork 8 on the side of the articulated head 4 lying opposite the first side. This distance represents the distance, over which the articulated head 4 is shiftable along the pin 12. Here, two pins 12 are led and secured through two bores 14 on a line in the tines of the fork 8, which line simultaneously forms the first rotation axis.

Summarizing, the articulated head 4 is here so seated on the slider 3, that it has three degrees of freedom, two translational degrees of freedom along two axes perpendicular to the linear guide and to the slider itself and at least one rotational degree of freedom about one of the two axes of its translational degrees of freedom, in, in each case, predetermined amount, i.e. limited distance or angle.

The slider 3 is pushed onto the linear guide and there secured to the threaded nut. In order to lessen friction between slider 3 and the linear guide, slide bushings 9 are supplementally placed between slider 3 and the linear guide.

List of Reference Characters
 1 retractable assembly
 2 linear guide
 3 slider
 4 articulated head
 5 threaded nut
 6 hex heads
 7 holder
 8 fork
 9 slide bushings
 10 first clamping jaw
 11 second clamping jaw
 12 pin
 13 groove
 14 bore
 15 tightening screws 16 connecting screws
17 opening for the insertable device
18 third clamping jaw
19 fourth clamping jaw

The invention claimed is:

1. A retractable assembly for introducing an insertable device into a container through a container opening, comprising:
 a linear guide, which is releasably mountable on the container via a holder; and
 a slider guided along said linear guide, on which slider an articulated head is so seated, said slider has at least a first translational degree of freedom perpendicular to said linear guide, and said slider has at least a first rotational degree of freedom about a first rotation axis perpendicular to said linear guide and perpendicular for the first translational degree of freedom, wherein:
 the insertable device is guided in the mounted state at least axially in the articulated head.

2. The retractable assembly as claimed in claim 1, wherein:
 said linear guide defines a longitudinal axis, and includes, rotatably journaled about its longitudinal axis, a spindle, which forms with said slider a gear unit, which converts a rotary movement of said spindle into a translational movement of the slider.

3. The retractable assembly as claimed in claim 2, wherein:
 said spindle has two end faces, each of which has a coupling for transmission of a torque about the longitudinal axis of said spindle to the spindle.

4. The retractable assembly as claimed in claim 1, wherein:
 said articulated head is so seated on said slider that it has a second translational degree of freedom perpendicular to said linear guide and perpendicular to the first translational degree of freedom.

5. The retractable assembly as claimed in claim 1, wherein:
 said articulated head is seated on said slider rotatably about a second rotation axis perpendicular to said linear guide and perpendicular to the first rotation axis.

6. The retractable assembly as claimed in claim 1, wherein:
 there is secured to said slider a fork, which has a vertical axis and on which a pin is arranged perpendicular to said linear guide and perpendicular to the vertical axis of said fork; and
 said pin is seated in an offset groove of said articulated head and limits movement of the articulated head along the groove; and
 said fork limits movement of said articulated head along said pin.

7. A system for introducing an insertable device into a container through a container opening, comprising:
 a retractable assembly as claimed in claim 1;
 a container; and
 said insertable device, wherein:
 the linear guide has a holder, which is so embodied that the linear guide is releasably mountable on a nozzle set on the container and embodied to be complementary to the holder of the linear guide.

8. The system as claimed in claim 7, wherein:
 the nozzle has a valve for opening and closing the container opening.

9. The system as claimed in claim 7, wherein:
 said articulated head has a tightening apparatus, which is so embodied that said insertable device is clampable in the articulated head at a predetermined location of said insertable device.

10. The system as claimed in claim 7, wherein:
 said insertable device is a flow measuring device or a temperature measuring device.

\* \* \* \* \*